Dec. 15, 1953
J. E. COMEAU
2,662,547
FLOW CONTROL APPARATUS
Filed Sept. 3, 1946
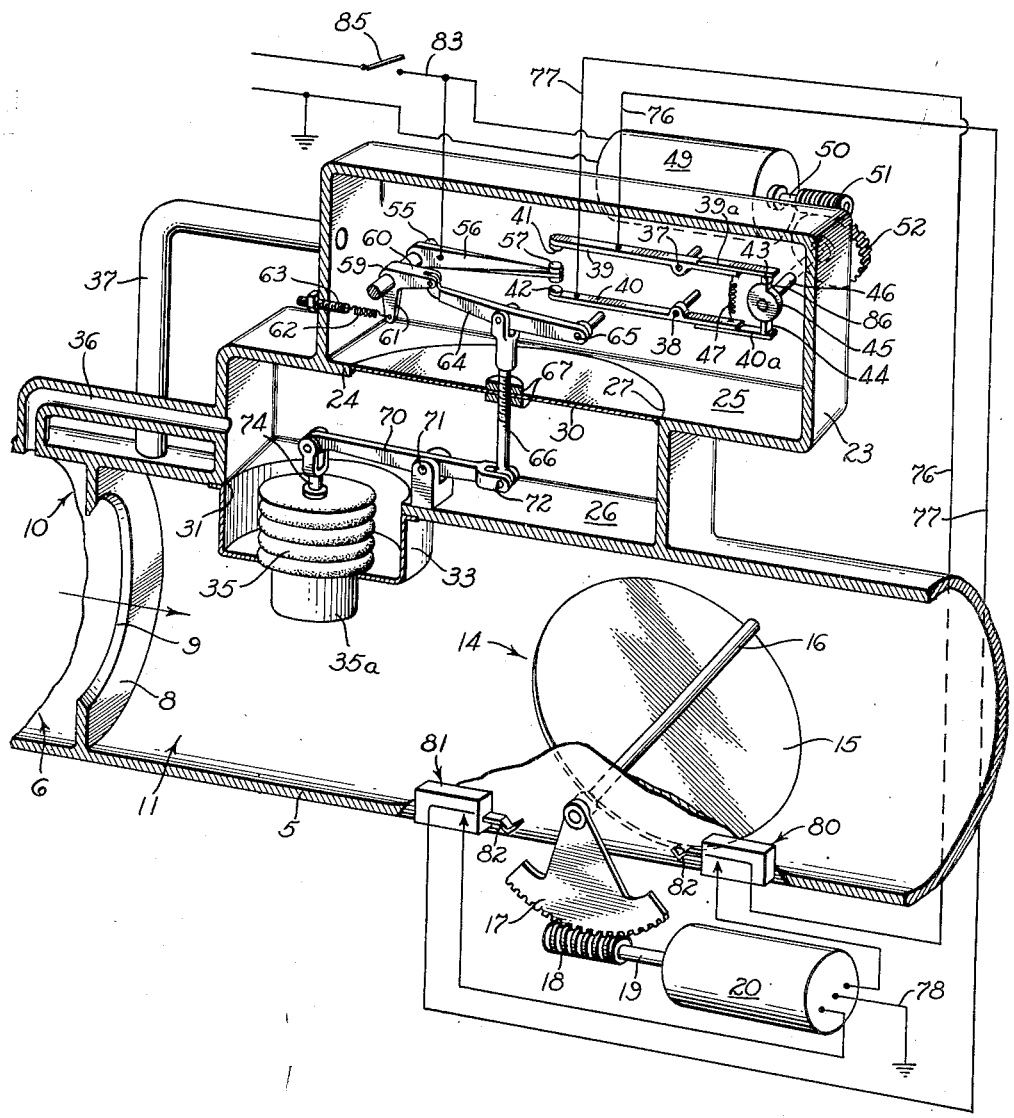
INVENTOR.
JOHN E. COMEAU
BY HIS ATTORNEYS.
HARRIS, KIECH, FOSTER & HARRIS
BY Patented Dec. 15, 1953

2,662,547

UNITED STATES PATENT OFFICE 2,662,547

FLOW CONTROL APPARATUS

John E. Comeau, Culver City, Calif., assignor to The Garrett Corporation, Los Angeles, Calif., a corporation of California Application September 3, 1946, Serial No. 694,498

11 Claims. (Cl. 137—468)

My invention relates generally to fluid flow control apparatus and particularly to a constant weight fluid flow control device for controlling automatically the flow of air to the cabin of an aircraft or to other compartments.

One object of my invention is to provide a constant weight fluid control device which is capable of supplying automatically the required mass of air per unit of time at a desired pressure and to change the air with the required frequency to provide comfort to the passengers in the cabin of the aircraft regardless of the density and temperature of the air.

Another object is to provide a constant weight fluid flow control device having means responsive to variations in pressure differential between spaced points in the air supply duct and to variations in density of the air supply, and to either, for maintaining automatically the required mass of air per unit of time.

Another object is to provide a fluid flow control device for use with an air supply duct having a restricted orifice or other means for producing a fluid pressure differential in the duct, said device being operative to control the setting of a valve movable in said duct.

Another object is to provide a device of the type indicated in which the flow control valve preferably is adjusted by a reversible motor, the energization of which is controlled by the pressure responsive and density responsive means.

Another object is to provide a device of the character referred to employing a diaphragm which is responsive to variations in the pressure differential between spaced points in the supply duct to actuate switch means for controlling the operation of the valve motor and also including a compensating means, preferably in the form of a bellows, which is responsive to variations in the density of the air in the duct to control the actuation of the switch means.

Another object is to provide a constant weight fluid flow control device which is entirely automatic in operation and which is comparatively simple in construction and generally efficient in performing its intended function.

Further objects of my invention are set forth in the following specification and in the drawing, which is intended for illustration only.

In the accompanying drawing the constant weight fluid flow control device is illustrated in a part-sectional perspective view which also embodies a diagram of the electrical circuit for the valve operating motor.

Referring to the drawing in detail, the constant weight fluid flow control device is shown as applied to use in controlling the rate of fluid flow through a duct 5 which may constitute the supply duct for supplying the required mass of air per unit of time to the cabin of an airplane, the discharge end of a suitable air compressor (not shown) being connected to the end 6 of the duct. Provided in the upstream end of the duct 5 is a pressure differential device, herein shown as a septum or partition 8 having a restricted orifice 9, the septum 8 thus dividing the duct 5 into a high pressure area 10 and a relatively lower pressure area 11. It will be readily apparent that other means, such as a Venturi tube, may be employed for creating a pressure differential between spaced points within the supply duct 5, this invention not being limited to any specific means for producing a pressure differential.

Disposed in the downstream end of the duct 5 is a valve means indicated generally at 14. While any suitable valve means may be utilized, I prefer to employ a valve of the butterfly type having a closure flap 15 carried by a shaft 16, the ends of which are rotatable in opposite sides of the duct. One end of the valve shaft 16 projects beyond the side of the duct and fast on this end is a worm wheel sector 17. The sector 17 is adapted to be rotated by a worm 18 fast on the armature shaft 19 of a reversible electric motor 20 mounted in any suitable manner adjacent the duct 5. It will be apparent that when the electric motor 20 is energized it will operate, through its armature shaft 19, the worm 18 and the sector 17 to pivot the butterfly valve flap 15 in either direction, depending upon the direction of rotation of the motor as controlled by means to be described hereinafter.

Formed integral with or as a separate member attached to the duct 5 is a hollow casing 23 having a septum or partition wall 24 dividing the casing into an upper chamber 25 and a lower chamber 26. The wall 24 has a relatively large opening 27 across which extends a diaphragm 30, the peripheral edge of the diaphragm being suitably attached to the wall 24 to provide an airtight connection. The lower portion of the casing 23 is provided with an opening 31 communicating with the lower pressure area 11 within the duct 5. Held in the opening 31 is a cup-shaped holder member 33 which may extend down into the duct 5. The holder member 33 supports a vapor- or gas-filled density-responsive bellows element 35 having a hollow dome-shaped rigid cap 35a extending into the duct 5 beyond the holder member. A tube or conduit 36 communicates between the high pressure area 10 of the duct 5 and the lower chamber 26 of the casing 23 and a similar conduit 37 communicates between the lower pressure area 11 of the duct and the upper chamber 25 of the casing. It will be seen from the above that the fluid pressure differential occurring between the areas 10 and 11 of the duct 5 will act to flex the diaphragm 30 and that the pressure of the air within the chamber 26 will cause expansion and contraction of the bellows element 35 in the manner well known to those versed in the art. Temperature changes in the air flowing in the duct 5 will be impressed on the bellows cap 35a, thereby causing the gas or vapor in the bellows to expand or contract and thus cause the bellows to distend or shorten. The combined action of the bellows 35 under variations in density and the diaphragm 30 under variations in pressure serves to energize and de-eergize the electric motor 20 through instrumentalities to be next described.

Pivoted on insulated studs 37 and 38 within the casing 23 are opposite switch members 39 and 40 having spring arms 39a and 40a. At their outer ends the members 39 and 40 have contact buttons 41 and 42, respectively. The ends of the members 39a and 40a carry fiber cam-followers 43 and 44 engageable with opposite sides of an edge-cam 45 carried by a shaft 46 journaled in the side of the casing 23. The folowers 43 and 44 are maintained in engagement with the cam 45 by means of a spring 47 connected between the members 39 and 40. During the supplying of pressurized air to the aircraft cabin the cam 45 and shaft 46 are rotated continuously by an electric motor 49 mounted on or adjacent the casing 23, the armature shaft 50 of the motor 49 carrying a worm 51 which drives a worm wheel 52 fast on the shaft 46. The switch members 39 and 40 thus are continuously oscillated in generally parallel relationship to cause the contacts 41 and 42 to move in unison from side to side.

Pivoted on a stud 55 within the chamber 25 is a contact arm 56 having a contact 57 at its end adapted to engage the contacts 41 and 42 of the switch members 39 and 40. Operatively connected to the contact arm 56 is a bell-crank lever 59 having a substantially horizontal arm 60 and a substantially vertical arm 61 to which one end of a spring 62 is connected, the other end of the spring being anchored to a tension-adjusting stud 63 on the casing 23. The arm 60 of the bell-crank lever 59 is pivotally connected to one end of a third-class lever 64 which is pivoted on a pin 65. Substantially midway between its ends the lever 64 is pivotally connected to the upper clevis end of a push-rod 66 which extends downwardly through a hole in the diaphragm 30. Nuts 67 screwed onto a threaded portion of the rod 66 and set up against opposite sides of the diaphragm 30 connect these parts together so that flexing of the diaphragm imparts vertical movement to the rod. Vertical movement of the rod 66 under the influence of the diaphragm 30 may be augmented or opposed by means of a first-class lever 70 which is pivoted at 71 and which has one end pivotally connected to the lower end of the rod 66 at 72. The other end of the lever 70 is pivotally attached to an axial connector 74 secured to the upper end of the bellows element 35.

The reversible valve operating motor 20 has a pair of field windings, as is common in motors of this type, the branch circuit line 76 from one winding being connected to one switch member 39 and the branch circuit line 77 of the other winding being joined to the other switch member 40. A ground wire 78 is common to both windings. Interposed in the lines 76 and 77 are normally-closed limit switches 80 and 81, respectively, the actuating arms 82 of these switches being adapted to be engaged by the ends of the worm wheel sector 17 as the latter is rotated in opposite directions and to open the circuit to the particular winding of the motor which is energized at the time. Electrical current is supplied through a main line 83 to the contact arm 56 and flows to either of the branch lines 76 and 77, depending upon which switch member 39 or 40 is engaged with the contact arm. The electrical circuit may also include a manually operable switch 85 for initiating and arresting operation of the entire fluid flow control device. My improved constant weight fluid flow control device having been described in detail, the method of operation thereof is explained as follows:

To start the operation of the control device the main switch 85 is closed and the switch-actuating motor 49 thus is energized to rotate the cam 45 to cause the switch members 39 and 40 to be oscillated in unison by the single lobe 86 of the cam. Assuming that the contact arm 56 is in the position shown in the drawing, that is, with its contact 57 midway between the contacts 41 and 42 of the respective members 39 and 40, as the members are oscillated they will fail to engage the contact arm and thus electrical flow through the branch circuits 76 and 77 will be prevented and the butterfly valve 15 will remain stationary. The air compressor (not shown) is then started to effect the flow of pressurized air through the duct 5 to the cabin of the airplane. Due to the restricted orifice 9, an area 10 of relatively high pressure is provided at the upstream side of the septum 8 and an area 11 of relatively lower pressure is produced at the downstream side of the septum, thus creating a pressure differential therebetween. In the present cabin pressurizing system the air compressor unit supplies air continuously and the improved control device merely regulates the flow of said pressurized air to the aircraft cabin without varying the output of the compressor unit.

It can be shown that the mass flow of air through an orifice varies in accordance with the following closely approximate law:

$$M = CA\sqrt{\rho \Delta P}$$

where
$M$ = mass flow
$C$ = a constant
$A$ = effective orifice area
$\rho$ = air density
$\Delta P$ = static pressure upstream of orifice minus static pressure downstream of orifice.

From this law, it will be apparent that in the present control, since the orifice area is constant, the device must sense changes in density $\rho$ and changes in pressure differential $\Delta P$, in order to maintain a desired mass flow. Since the density $\rho$ is directly proportional to the absolute pressure and inversely proportional to the absolute temperature, the bellows 35 senses both of these variables in order to sense density. The diaphragm 30 senses variations in pressure differential $\Delta P$.

While the apparatus herein described does not relate the variables $\rho \Delta P$ in the precise relationship set forth in the law above, it does relate such variables in a manner sufficiently close to such relationship as to provide a sensing of variations in mass flow sufficiently accurate for most practical purposes.

The air under pressure is transmitted from the relatively high and lower pressure areas 10 and 11 of the duct 5 through the conduits 36 and 37 into the respective compartments 25 and 26 and the pressure differential thus created on opposite sides of the diaphragm 30 causes the latter to flex. If the pressure differential is greater than a predetermined value the diaphragm 30 will act through the push-rod 66, lever 64 and bell-crank lever 60 to pivot the contact arm 56 in an upward direction to cause its contact 57 to move toward the contact 41 of the switch member 39. Consequently, when the switch member 39 pivots downwardly under the action of the cam 45 its contact 41 will momentarily engage the contact 57 to close the electrical circuit to the valve-operating motor 20 through the branch line 76 and limit switch 81. The motor 20 thus is energized and functions through its worm 18 to rotate the worm-wheel sector 17 in a direction to pivot the butterfly valve flap 15 toward closed position to reduce the rate of flow of pressurized air to the cabin. Due to the fact that the switch member 39 is constantly oscillated by the cam 45 and makes contact with arm 56 for a length of time proportional to the instantaneous departure of the actual mass flow from the desired value at any moment, the circuit to the motor is periodically opened and closed and the motor intermittently energized or pulsed to cause the valve flap 15 to move with a rapidity proportional to the need for changing its position. It will be noted by reference to the drawing that the lobe 86 of the cam 45 has a gradual incline and an abrupt return edge so that the switch member 39 will move gradually toward the contact arm 56 and be disengaged from the arm at a relatively fast rate. It will be apparent that the oscillations of the switch members 39 and 40 may be of any desired frequency, provided the frequency is greater than twice the natural hunting frequency of the system controlled, this relationship being necessary to prevent hunting.

As the valve 14 is moved toward a closed position in the manner explained above, the pressure differential will decrease so that the diaphragm 30 will act to gradually lower the contact arm 56 to increase the gap between the contacts 57 and 41. Eventually, the contact 57 will be disposed centrally of the contacts 41 and 42 and thus the valve motor 20 will be de-energized and the valve flap 15 will remain in the position to which it has been adjusted until again acted upon by the motor drive. Assuming now that the pressure differential becomes less than a predetermined required value, flexing of the diaphragm 30 will decrease and thus the contact arm 56 will be moved downwardly to cause its contact 57 to approach the contact 42 of the switch member 40. As the switch member 40 is oscillated the branch circuit 77 will be periodically closed to cause intermittent energization of the motor 20 in a direction to rotate the valve flap 15 toward open position. It is essential that the contact buttons 41 and 42 engage lightly with the contact 57 of the arm 56 to prevent undue force thereagainst which would be transmitted through the arm 56, lever 62 and rod 65 to impair the effectiveness of the diaphragm 30 and bellows 35. In the present device, the spring arms 39a and 40a are employed for the purpose of effecting a yielding engagement of the contacts.

As thus far explained, the position of the contact arm 56 is controlled by the pressure differential responsive diaphragm 30. However, the air, which is supplied to the chamber 26 also acts against the vapor- or gas-filled bellows element 35 to cause contraction or expansion in the length thereof in the manner well-known to those versed in the art. Such variation in the length of the bellows element 35 is transmitted through the lever 70 to the push-rod 66 to alter the position of the contact arm 56. It is thus seen that the position of the contact arm 56 is determined and controlled by the combined effects of movement of the diaphragm 30 in response to variations in fluid pressure differential, and movement of the bellows 35 in response to variations in fluid density. Since gaseous fluid density varies with changes in temperature and pressure, the bellows element 35 is responsive to variations in these properties of the air. The duration of the time of contact between contact 57 and either contact 41 or 42 for any one revolution of the cam 45 is directly proportional to the displacement of arm 56 from its neutral position, and this displacement, in turn, is directly proportional to the variation of the mass flow of air from the desired normal flow. Because the position of the contact arm 56 determines the adjustment or setting of the butterfly valve and the arm is adjusted automatically in accordance with variations in the fluid pressure differential and in the fluid density, there is conveyed through the duct 5 a mass of air per unit of time which is constant regardless of variations in the pressure and temperature of the air. It will be apparent that by adjusting the tension of the spring 62 the force necessary to pivot the contact arm 56 may be varied and since this force is responsive to variations in fluid pressure differential and fluid density, the desired mass of air per unit of time may be readily obtained. My control device thus supplies automatically the required mass of air per unit of time to the cabin of the aircraft and acts to change the air therein with the required frequency to provide comfort to the passengers regardless of the density and temperature of the air.

While I have herein shown and described the constant weight flow control device as embodied in a preferred construction having its elements arranged in a specific manner, it will be apparent that various changes and modifications may be made therein without departing from the spirit of my invention and I therefore reserve the right to all such changes as fall within the scope of the appended claims.

I claim as my invention:

1. A constant weight fluid flow control device, including: a duct for conveying fluid; a septum in said duct and provided with a restricted opening, said septum and opening providing in said duct a high pressure region and a relatively lower pressure region for effecting a fluid pressure differential therebetween; a casing; a diaphragm disposed in said casing and dividing said casing into two compartments; a first conduit connected between said high pressure region and one of said compartments; a second conduit connected between said lower pressure region and the other of said compartments; rotatable valve means in said duct disposed downstream from said opening for regulating the rate of fluid flow through said duct, said valve means having a worm wheel sector; a reversible electric motor having a worm meshing with said sector for rotating said valve means in either direction; a main electric circuit having a pair of branch circuits for said motor; switch means in said branch circuits and operatively connected to said diaphragm, said diaphragm being responsive to variations in fluid pressure differential in said compartments to open and close said switch means; and means responsive to variations in fluid density in the high pressure region of said duct to open and close said switch means.

2. A constant weight fluid flow control device, including: a duct for conveying fluid; a septum in said duct and provided with a restricted opening, said septum and opening providing in said duct a high pressure region and a relatively lower pressure region for effecting a fluid pressure differential therebetween; a hollow casing having a partition wall provided with an opening; a diaphragm extending across said opening, said wall and said diaphragm dividing the interior of said casing into two compartments; a first conduit connected between said high pressure region and one of said compartments; a second conduit connected between said lower pressure region and the other of said compartments; rotatable valve means in said duct disposed downstream from said septum for regulating the rate of fluid flow through said duct; a reversible electric motor for rotating said valve means in either direction; a main electric circuit having a pair of branch circuits for said motor; switch means in each of said branch circuits; a movable contact element connected in said main circuit and engageable with either of said switch means to close either of said branch circuits to said motor; actuating means operatively connected between said contact element and said diaphragm for moving said contact element, said diaphragm being responsive to variations in fluid pressure differential in said compartments to operate said actuating means; and means responsive to variations in static pressure in said duct upstream of said septum and temperature downstream of said septum to operate said actuating means.

3. A constant weight fluid flow control device, including: a duct for conveying fluid; a septum in said duct and provided with a restricted opening, said septum and opening providing in said duct a high pressure area and a relatively lower pressure area for effecting a fluid pressure differential therebetween; a hollow casing having a partition wall provided with an opening; a diaphragm extending across said opening, said partition and said diaphragm dividing the interior of said casing into two compartments; a first conduit connected between said high pressure area and one of said compartments; second conduit connected between said lower pressure area and the other of said compartments; rotatable valve means in said duct disposed downstream from said septum for regulating the rate of fluid flow through said duct; a reversible electric motor for rotating said valve means in either direction; a main electric circuit having a pair of branch circuits for said motor; a movable switch member in each of said branch circuits, said switch members being disposed in spaced relationship; a contact element connected in said main circuit and adjustable between said switch members, said contact element being operatively connected to said diaphragm to adapt it to be adjusted thereby, said diaphragm being adapted to be flexed in response to variations in fluid pressure differential in said compartments; means for intermittently moving said switch members into and out of engagement with said contact element, to open or close either of said branch circuits, the position of said contact element as adjusted by the flexing of said diaphragm determining the duration of engagement of either switch member with said contact element to control the duration of intermittent energization of either of said branch circuits; and means responsive to variations in fluid density in said duct to adjust said contact element.

4. A constant weight fluid flow control device as defined in claim 3 in which said means for intermittently moving said switch means includes continuously operating cam means engaging both switch means.

5. A constant weight fluid flow control device as defined in claim 3 and including limit switches in circuit with said switch means for opening said branch circuits upon rotative movement of said valve means in either direction to predetermined positions.

6. A constant weight fluid flow control device as defined in claim 2 and including means for regulating the resistance to movement of said contact arm under the influence of said diaphragm to vary the weight fluid flow to be maintained at a constant value by said device.

7. A constant weight fluid flow control device, including: a duct for conveying fluid; a septum in said duct and provided with a restricted opening, said septum and opening providing in said duct a high pressure area and a relatively lower pressure area for effecting a fluid pressure differential therebetween; a hollow casing having a partition wall provided with an opening; a diaphragm extending across said opening, said partition and said diaphragm dividing the interior of said casing into two compartments; a first conduit connected between said high pressure area and one of said compartments; second conduit connected between said lower pressure area and the other of said compartments; rotatable valve means in said duct disposed downstream from said septum for regulating the rate of fluid flow through said duct; a reversible electric motor for rotating said valve means in either direction; a main electric circuit having a pair of branch circuits for said motor; a movable switch member in each of said branch circuits, said switch members being disposed in spaced relationship; a contact element connected in said main circuit and adjustable between said switch members, said contact element being operatively connected to said diaphragm to adapt it to be adjusted thereby, said diaphragm being adapted to be flexed in response to variations in fluid pressure differential in said compartments; means for intermittently moving said switch members into and out of engagement with said contact elements, to open or close either of said branch circuits, the position of said contact element as adjusted by the flexing of said diaphragm determining the duration of engagement of either switch member with said contact element to control the duration of intermittent energization of either of said branch circuits, said means for intermittently moving said switch means including cam means and power means for continuously operating said cam means, said cam means engaging both switch means and being operative to simultaneously move both said switch means; and means responsive to variations in fluid density in said duct to adjust said contact element.

8. A constant weight fluid flow controlling device, including: a duct for conveying fluid; means in said duct for producing a pressure differential therein; movable valve means in said duct for regulating the rate of fluid flow therethrough, reversible operating means for moving said valve means toward open and closed positions, said reversible operating means having energizable means for effecting valve opening movement of said reversible operating means and energizable means for effecting valve closing movement of said reversible operating means; movable means for energizing only one of said energizable means at a time for effecting operation of the reversible operating means to cause it to operate in either direction; and means responsive to variations in fluid pressure differential produced by said differential producing means, means responsive to variations in fluid pressure in the higher pressure region of said duct and to the temperature in the lower pressure region of said duct for effecting movement of said energizing means.

9. A constant weight fluid flow control device, including: a duct for conveying fluid; a septum in said duct and provided with a restricted opening, said septum and opening providing in said duct a high pressure area and a relatively lower pressure area for effecting a fluid pressure differential therebetween; a hollow casing having a partition wall provided with an opening; a diaphragm extending across said opening, said partition and said diaphragm dividing the interior of said casing into two compartments; a first conduit connected between said high pressure area and one of said compartments; second conduit connected between said lower pressure area and the other of said compartments; rotatable valve means in said duct disposed downstream from said septum for regulating the rate of fluid flow through said duct; a reversible electric motor for rotating said valve means in either direction; a main electric circuit having a pair of branch circuits for said motor; a movable switch member in each of said branch circuits, said switch members being disposed in a spaced relationship; a contact element connected in said main circuit and adjustable between said switch members, said contact element being operatively connected to said diaphragm to adapt it to be adjusted thereby, said diaphragm being adapted to be flexed in response to variations in fluid pressure differential in said compartments; means for intermittently moving said switch members into and out of engagement with said contact element, to open or close either of said branch circuits, the position of said contact element as adjusted by the flexing of said diaphragm determining the duration of engagement of either switch member with said contact element to control the duration of intermittent energization of either of said branch circuits; and means responsive to variations in fluid pressure and temperature in said duct to adjust said contact element.

10. A constant weight fluid flow control device, including: a duct for conveying fluid; a septum in said duct and provided with a restricted opening, said septum and opening providing in said duct a high pressure area and a relatively lower pressure area for effecting a fluid pressure differential therebetween; a hollow casing having a partition wall provided with an opening; a diaphragm extending across said opening, said partition and said diaphragm dividing the interior of said casing into two compartments; a first conduit connected between said high pressure area and one of said compartments; second conduit connected between said lower pressure area and the other of said compartments; rotatable valve means in said duct disposed downstream from said septum for regulating the rate of fluid flow through said duct; a reversible electric motor for rotating said valve means in either direction; a main electric circuit having a pair of branch circuits for said motor; a movable switch member in each of said branch circuits, said switch members being disposed in spaced relationship; a contact element connected in said main circuit and adjustable between said switch members, said contact element being operatively connected to said diaphragm to adapt it to be adjusted thereby, said diaphragm being adapted to be flexed in response to variations in fluid pressure differential in said compartments; means for intermittently moving said switch members into and out of engagement with said contact elements, to open or close either of said branch circuits, the position of said contact element as adjusted by the flexing of said diaphragm determining the duration of engagement of either switch member with said contact element to control the duration of intermittent energization of either of said branch circuits, said means for intermittently moving said switch means including cam means and power means for continuously operating said cam means, said cam means engaging both switch means and being operative to simultaneously move both said switch means; and means responsive to variations in fluid pressure and temperature in said duct to adjust said contact element.

11. A constant weight fluid flow control device, including: a duct for conveying fluid; a septum in said duct and provided with a restricted opening, said septum and opening providing in said duct a high pressure area and a relatively lower pressure area for effecting a fluid pressure differential therebetween; a hollow casing having a partition wall provided with an opening; a diaphragm extending across said opening, said partition and said diaphragm dividing the interior of said casing into two compartments; a first conduit connected between said high pressure area and one of said compartments; second conduit connected between said lower pressure area and other of said compartments; rotatable valve means in said duct for regulating the rate of fluid flow through said duct; a reversible electric motor for rotating said valve means in either direction; a main electric circuit having a pair of branch circuits for said motor; a movable switch member in each of said branch circuits, said switch members being disposed in spaced relationship; a contact element connected in said main circuit and adjustable between said switch members, said contact element being operatively connected to said diaphragm to adapt it to be adjusted thereby, said diaphragm being adapted to be flexed in response to variations in fluid pressure differential in said compartments; means for intermittently moving said switch members into and out of engagement with said contact element, to open or close either of said branch circuits, the position of said contact element as adjusted by the flexing of said diaphragm determining the duration of engagement of either switch member with said contact element to control the duration of intermittent energization of either of said branch circuits; and means responsive to variations in fluid density in said duct to adjust said contact element.

JOHN E. COMEAU.

References Cited in the file of this patent

UNITED STATES PATENTS

| Number | Name | Date |
|---|---|---|
| 1,992,048 | Temple | Feb. 19, 1935 |
| 2,210,317 | Dueringer | Aug. 6, 1940 |
| 2,217,636 | Rude | Oct. 8, 1940 |
| 2,231,568 | Gorrie | Feb. 11, 1941 |
| 2,295,728 | Gess | Sept. 15, 1942 |
| 2,299,529 | Crampton | Oct. 10, 1942 |
| 2,388,669 | Baker | Nov. 13, 1945 |
| 2,407,258 | Del Mar | Sept. 10, 1946 |
| 2,482,396 | Barr | Sept. 20, 1949 |